(12) United States Patent
Furuya et al.

(10) Patent No.: US 10,628,976 B2
(45) Date of Patent: Apr. 21, 2020

(54) INFORMATION PROCESSING SYSTEM, INFORMATION PROCESSING METHOD, AND STORAGE MEDIUM

(71) Applicant: Tokyo Electric Power Company Holdings, Incorporated, Tokyo (JP)

(72) Inventors: Hitoshi Furuya, Tokyo (JP); Kenjiro Kase, Tokyo (JP); Naohiro Minamide, Tokyo (JP); Shuuji Ueno, Tokyo (JP); Fumio Ishige, Tokyo (JP); Kouichi Onodera, Tokyo (JP); Katumi Yamada, Tokyo (JP); Masayuki Ichida, Tokyo (JP); Keijiro Shibui, Tokyo (JP); Hideo Mizuochi, Tokyo (JP)

(73) Assignee: Tokyo Electric Power Company Holdings, Incorporated, Tokyo (JP)

( * ) Notice: Subject to any disclaimer, the term of this patent is extended or adjusted under 35 U.S.C. 154(b) by 416 days.

(21) Appl. No.: 15/460,624

(22) Filed: Mar. 16, 2017

(65) Prior Publication Data
US 2017/0193678 A1 Jul. 6, 2017

Related U.S. Application Data

(63) Continuation-in-part of application No. PCT/JP2014/081764, filed on Dec. 1, 2014.

(51) Int. Cl.
*G06T 11/20* (2006.01)
*G06Q 50/06* (2012.01)
*G06Q 10/06* (2012.01)

(52) U.S. Cl.
CPC ............ *G06T 11/203* (2013.01); *G06Q 10/06* (2013.01); *G06Q 50/06* (2013.01)

(58) Field of Classification Search
CPC ...................................................... G06T 11/203
(Continued)

(56) References Cited

U.S. PATENT DOCUMENTS

2002/0035432 A1* 3/2002 Kubica ................... G06F 16/29
702/5
2005/0144182 A1* 6/2005 Boris ..................... G06Q 10/10
(Continued)

FOREIGN PATENT DOCUMENTS

JP 2005-338194 A 12/2005
JP 2006-330975 A 12/2006
(Continued)

OTHER PUBLICATIONS

Publication # 2014-191715, Nishigami Toru, Oct. 6, 2014.*
(Continued)

*Primary Examiner* — Javid A Amini
(74) *Attorney, Agent, or Firm* — Faegre Drinker Biddle & Reath LLP

(57) ABSTRACT

An information processing system includes a specifying unit specifying an electric facility to be an inspection target based on: information indicating positions of a plurality of electric facilities included in a line map including information indicating the positions of the plurality of electric facilities and information indicating a connection route between the electric facilities; and information indicating a position of an information processing terminal. The system further includes a display controller to: control the information processing terminal to display information indicating that the electric facility is finished with inspection on the line map based on information indicating an inspection result of the electric facility to be the inspection target specified by the specifying unit; and change a display state of the connection route displayed on the information processing
(Continued)

terminal in the case where an adjacent electric facility connected to the electric facility by the connection route is finished with inspection.

12 Claims, 10 Drawing Sheets

(58) Field of Classification Search
USPC .......................................................... 345/440
See application file for complete search history.

(56) References Cited

U.S. PATENT DOCUMENTS

| | | | | |
|---|---|---|---|---|
| 2006/0155865 A1* | 7/2006 | Brandt | ............... | H04L 63/02 709/230 |
| 2007/0255656 A1* | 11/2007 | Olson | ............... | G06Q 10/06 705/40 |
| 2009/0037485 A1* | 2/2009 | Radel | ............... | G06Q 20/102 |
| 2010/0110077 A1* | 5/2010 | Grossman | ............... | G06Q 10/06 345/440 |
| 2011/0227532 A1* | 9/2011 | Niwa | ............... | B60L 15/2045 320/109 |
| 2014/0052373 A1* | 2/2014 | Hoch | ............... | G01C 21/343 701/533 |

FOREIGN PATENT DOCUMENTS

| | | |
|---|---|---|
| JP | 2010-239731 A | 10/2010 |
| JP | 2014-191715 A | 10/2014 |

OTHER PUBLICATIONS

International Search Report dated Jan. 6, 2015 for PCT/JP2014/081764 (with attached English-language translation).
International Preliminary Report on Patentability dated Jul. 26, 2016 for PCT/JP2014/081764 (with attached English-language translation).

* cited by examiner

| EQUIPMENT | ITEM | EQUIPMENT | ITEM | EQUIPMENT | ITEM |
|---|---|---|---|---|---|
| ELECTRIC POLE | BRANCH CODE | TRANSFORMER/ SWITCH | BRANCH CODE | WIRE/ CABLE | BRANCH CODE |
| | ELECTRIC POLE ID INFORMATION | | MODEL NO./ SERIAL NO. | | HIGH PRESSURE/ LOW PRESSURE |
| | TYPE (WOOD POLE/ CONCRETE POLE/ DIMENSION/ LENGTH) | | CAPACITY | | MATERIAL (ALUMINUM/ COPPER) |
| | MANUFACTURING YEAR | | MANUFACTURING YEAR | | KIND (SNOW RESISTANT, etc.) |
| | MANUFACTURER | | MANUFACTURER | | THICKNESS |
| | INSTALLATION YEAR | | INSTALLATION YEAR | | MANUFACTURING YEAR |
| | | | | | INSTALLATION YEAR |

| ELECTRIC POLE ID | INSPECTION ITEM |
|---|---|
| | INSPECTION ITEM 1 |
| | INSPECTION ITEM 2 |
| | INSPECTION ITEM 3 |
| | INSPECTION ITEM 4 |
| | ... |

INFORMATION PROCESSING SYSTEM, INFORMATION PROCESSING METHOD, AND STORAGE MEDIUM

BACKGROUND

Technical Fields

Embodiments of the present invention generally relate to an information processing system, an information processing method, and a storage medium.

Related Art

In related art, research and development have been made on a device to assist inspection for an electric facility.

Japanese Unexamined Patent Application, First Publication No. 2010-239731 discloses an inspection and power outage planning assistance system for a generation/transformation unit, adapted to create a work plan in order to perform inspection, maintenance, repair, and construction for a facility/apparatus of a generation/transformation unit provided in a generation/transformation station in which power has to be interrupted during such work. The system is adapted to: store information related to facilities/apparatuses of the generation/transformation unit; store work information related to inspection, maintenance, repair, and construction performed in past with respect to the facilities/apparatuses of the generation/transformation unit; receive input of a model and specification related to a facility/apparatus to be a target of inspection, maintenance, repair, and construction out of electric power facilities included in the generation/transformation unit; determine candidates of the facility/apparatus in which power can be interrupted for inspection work based on the received facility/apparatus, and the stored information of the facilities/apparatuses and information related to inspection and the like; and calculate and determine, from among the generated candidates of the facilities in which power can be interrupted, operating workers and the number thereof based on a calculated and determined work load.

Meanwhile, at the time of performing patrol/inspection for an electric facility, a worker needs to bring a map indicating a position of the electric facility, a map indicating a logical connection between electric facilities, a card to write an inspection result of an inspection item, and so on, and there may be a risk that the worker loses such maps, card, and so on. Furthermore, the worker having finished the patrol/inspection of electric facilities needs to store a number of patrol/inspection results by manual input in a server and the like as soon as returning to an office or the like, and a great deal of time and labor is required. Moreover, these problems cannot be resolved by the system in the related art.

SUMMARY

An information processing system, may include, but is not limited to, a specifying unit configured to specify an electric facility to be an inspection target based on: information indicating positions of a plurality of electric facilities included in a line map that includes information indicating the positions of the plurality of electric facilities and information indicating a connection route between the electric facilities; and information indicating a position of an information processing terminal; and a display controller configured to control the information processing terminal to display information indicating that the electric facility is finished with inspection on the line map based on information indicating an inspection result of the electric facility to be the inspection target specified by the specifying unit, and perform display change processing to change display of the connection route displayed on the information processing terminal to display indicating a connection route between the electric facilities finished with inspection in the case where an adjacent electric facility connected to the electric facility by the connection route is finished with inspection.

Further features and aspects of the present disclosure will become apparent from the following detailed description of exemplary embodiments with reference to the attached drawings.

BRIEF DESCRIPTION OF THE DRAWINGS

FIG. 9 is a diagram illustrating exemplary information included in facility information stored in a facility information DB.

FIG. 10 is a diagram illustrating exemplary information included in inspection item information stored in a facility inspection information DB.

DETAILED DESCRIPTION OF THE EMBODIMENTS

Figure 1:
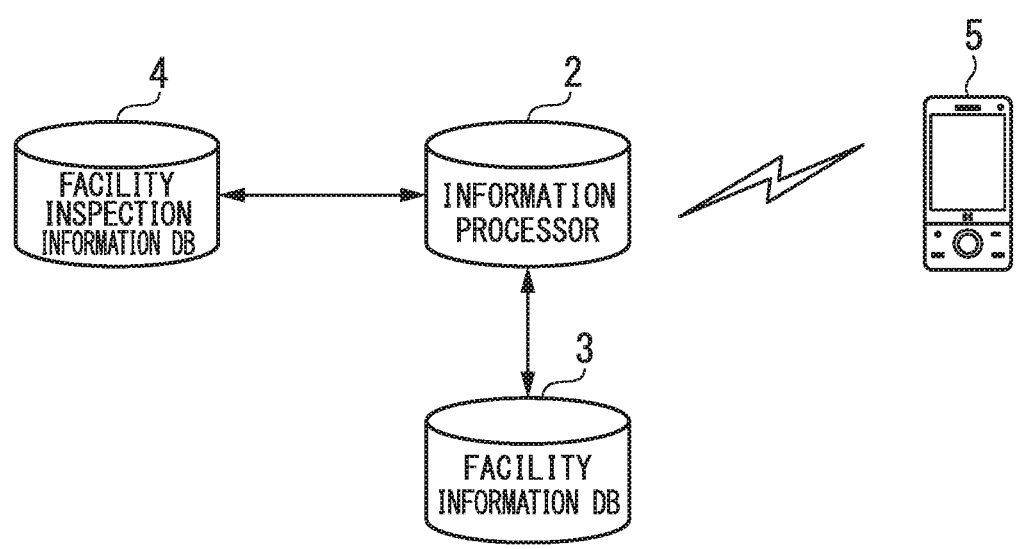
FIG. 1 is a diagram illustrating an exemplary configuration of an information processing system.

In some embodiments, an information processing system, may include, but is not limited to, a specifying unit configured to specify an electric facility to be an inspection target based on: information indicating positions of a plurality of electric facilities included in a line map that includes information indicating the positions of the plurality of electric facilities and information indicating a connection route between the electric facilities; and information indicating a position of an information processing terminal; and a display controller configured to control the information processing terminal to display information indicating that the electric facility is finished with inspection on the line map based on information indicating an inspection result of the electric facility to be the inspection target specified by the specifying unit, and perform display change processing to change display of the connection route displayed on the information processing terminal to display indicating a connection route between the electric facilities finished with inspection in the case where an adjacent electric facility connected to the electric facility by the connection route is finished with inspection.

In some cases, the information processing system may further include, but is not limited to, a line map storage configured to store line map information indicating the line map. The specifying unit reads the line map information from the line map storage and specifies the electric facility to be the inspection target based on information indicating the positions of the plurality of electric facilities included in the read line map information.

In some cases, the information processing system may further include, but is not limited to, a screen information generator configured to generate first display image information indicating a first display image to be displayed by the information processing terminal based on the information indicating the positions of the plurality of electric facilities included in the line map and the information indicating the position of the electric facility to be the inspection target specified by the specifying unit, and configured to generate second display image information that causes the display controller to change a display state of the first image display based on the information indicating an inspection result of the electric facility to be the inspection target. In the case of acquiring the first display image information, the display controller controls the information processing terminal to display the first display image based on the first display image information, and in the case of acquiring the second display image information, the display controller performs display change processing on the first display image based on the second display image information.

In some cases, the information processing system may further include, but is not limited to, a determiner configured to determine whether all of inspection items relative to the electric facility to be the inspection target are finished with inspection. In the case where a part or all of the inspection items are finished with inspection, the display controller performs the display change processing, and in the case where all of the inspection items are not finished with inspection, the display controller controls the information processing terminal to display information indicating an error.

In other embodiments, an information processing method may include, but is not limited to, specifying an electric facility to be an inspection target based on: information indicating positions of a plurality of electric facilities included in a line map that includes information indicating the positions of the plurality of electric facilities and information indicating a connection route between the electric facilities; and information indicating a position of an information processing terminal; and controlling the information processing terminal to display information indicating that the electric facility is finished with inspection on the line map based on information indicating an inspection result of the specified electric facility to be the inspection target, and performing display change processing to change display of the connection route displayed on the information processing terminal to display indicating a connection route between the electric facilities finished with inspection in the case where an adjacent electric facility connected to the electric facility by the connection route is finished with inspection.

In other embodiments, a non-transitory computer readable storage medium that stores a program, when executed by a computer, to cause the computer to perform at least: specifying an electric facility to be an inspection target based on: information indicating positions of a plurality of electric facilities included in a line map that includes information indicating the positions of the plurality of electric facilities and information indicating a connection route between the electric facilities; and information indicating a position of an information processing terminal; and controlling the information processing terminal to display information indicating that the electric facility is finished with inspection on the line map based on information indicating an inspection result of the specified electric facility to be the inspection target, and perform display change processing to change display of the connection route displayed on the information processing terminal to display indicating a connection route between the electric facilities finished with inspection in the case where an adjacent electric facility connected to the electric facility by the connection route is finished with inspection.

The term "facility" used in embodiments refers to every tangible thing, which can in generally be designed, constructed, built, manufactured, installed, and maintained for performing any purpose, activities or functions in human society. In some cases, the facility may include, but is not limited to, a permanent, semi-permanent or temporary commercial or industrial property such as building, plant, or structure for performing any purpose, activities or functions in human society.

The term "event" used in embodiments refers to something that happens such as a social occasion or activity.

The term "equipment" used in embodiments refers to a set of one or more tangible articles or physical resources such as, but not limited to, some structural or tangible elements, apparatus, devices, or implements used in an operation or activity; fixed assets other than land and buildings.

The term "equipment/material" used in embodiments refers to at least one of equipment and material, for example, equipment alone, material alone or in combination.

First Embodiment

Hereinafter, Embodiment 1 of the present invention will be described with reference to the drawings. FIG. 1 is a diagram illustrating an exemplary configuration of an information processing system 1. The information processing system 1 includes an information processor 2, a facility information Database (DB) 3, a facility inspection information DB 4, and an information processing terminal 5.

First, an outline of the information processing system 1 according to Embodiment 1 will be described. The information processing system 1 assists inspection work to patrol and inspect an electric facility. Assisting the inspection work represents displaying, on a display of the information processing terminal 5, information indicating an electric facility finished with the inspection by a user and information indicating a connection route between the electric facilities finished with the inspection work when the user of the information processing system 1 patrols and inspects a plurality of electric facilities. In this example, inspection for an electric facility represents inspecting a part or all of inspection items preliminarily determined for each electric facility. In the following description, the inspection work to patrol and inspect an electric facility will be simply referred to as inspection work for convenience of description. Furthermore, in the following description, an electric facility in which inspection has been finished will be referred to as an electric facility finished with inspection (for example, in the case where the electric facility is the electric pole, an electric pole finished with inspection).

A user of the information processing system 1 is, for example, an employee who inspects electric facilities owned by an electric company, but may also be a person who supports the employee, or the like. The electric facility may be an electric pole, a transformer, an electric wire, a cable, an on-road apparatus for an underground cable, and the like, but may also be another facility. Meanwhile, a case where the electric facility is an electric pole will be described below for convenience of explanation. Furthermore, in the following description, the user of the information processing system 1 will be simply referred to as a user.

The information processor 2 is a server that generates display screen information in order to generate a display screen to assist the inspection work at the information processing terminal 5 based on various kinds of information transmitted from the information processing terminal 5. The information processor 2 transmits generated display image information to the information processing terminal 5. The information processor 2 and the facility information DB 3 are mutually connected in a communicable manner via wire or radio. Furthermore, the information processor 2 and the facility inspection information DB 4 are mutually connected in a communicable manner via wire or radio. Furthermore, the information processor 2 and the information processing terminal 5 are mutually connected in a communicable manner via wire or radio. Note that communication between the information processor 2 and the information processing terminal 5 is communication utilizing a mobile communication network, wireless local area network (LAN), or the like.

The facility information DB 3 stores, as facility information, information related to an electric facility to be inspected by the user for each kind of electric facility.

The facility inspection information DB 4 stores inspection item information indicating items to be inspected by the user in the inspection work for each kind of electric facility.

The information processing terminal 5 is, for example, a tablet personal computer (PC), a multi-functional mobile phone (smartphone), a mobile phone terminal, an electronic book reader, a personal digital assistant (PDA), or the like. In the information processing terminal 5, an application program to assist the inspection work executed by the user is installed and assists the user's inspection work via a graphical user interface (GUI) of the application program. More specifically, the information processing terminal 5 displays a display screen to assist the inspection work via the GUI.

Figure 2:
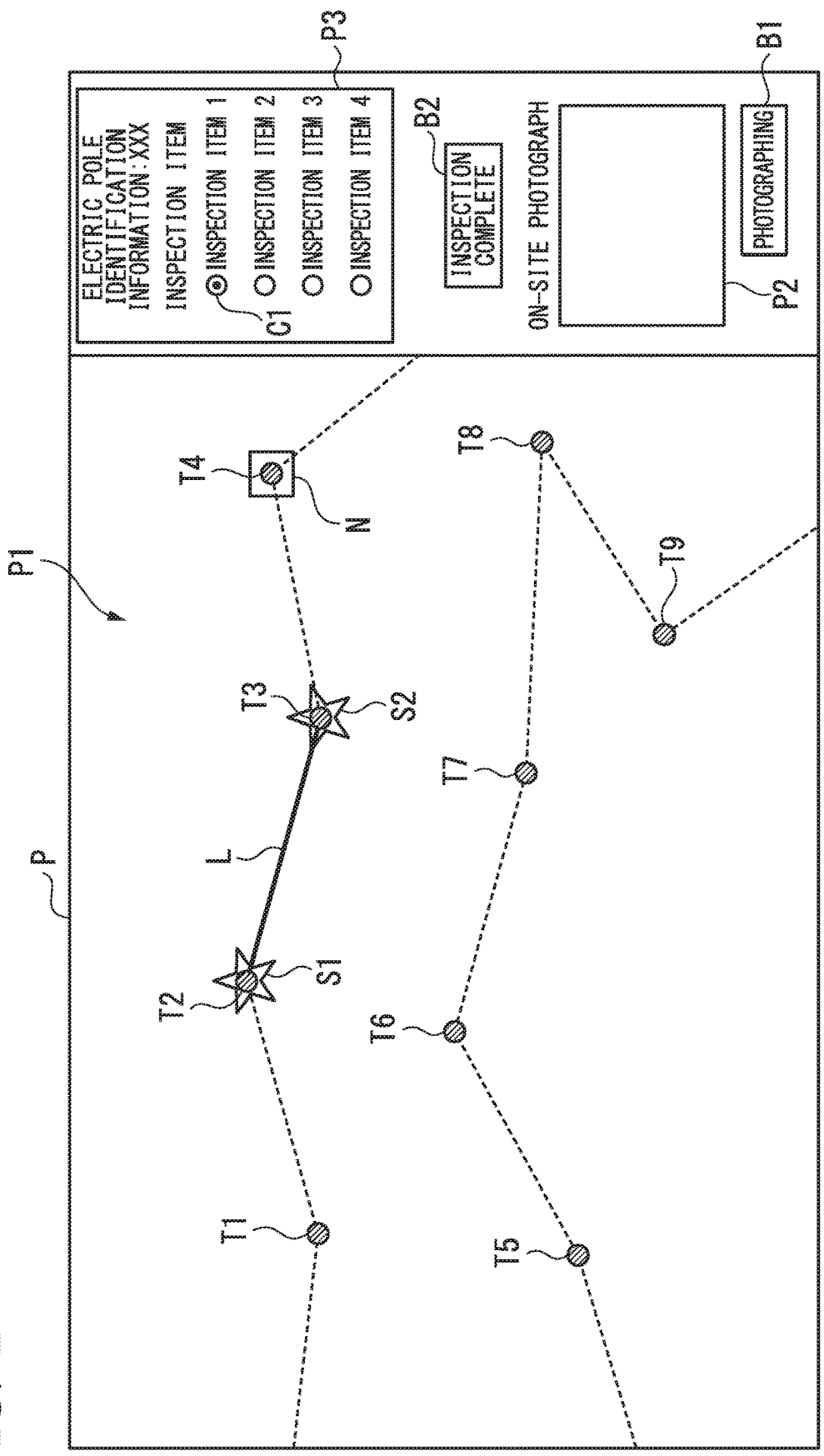
FIG. 2 is a diagram illustrating an exemplary display image displayed by a GUI of an application program that assists inspection work executed by a user.

Here, the display screen displayed by the GUI of the application program that assists the inspection work executed by the user will be described with reference to FIG. 2. FIG. 2 is a diagram illustrating an exemplary display screen displayed by the GUI of the application program that assists the inspection work executed by the user. In the following description, the GUI of the application program that assists the inspection work executed by the user will be simply referred to as GUI for convenience of explanation.

As illustrated in FIG. 2, the GUI causes the information processing terminal 5 to display a display screen P. On the display screen P, at least a map P1, an on-site photograph P2, an inspection item image P3, a photographing button B1, and an inspection complete button B2 are displayed.

On the map P1, an electric facility map and a distribution line map are displayed in an overlapping manner. The electric facility map is a map in which information indicating respective positions of a plurality of electric facilities existing in a certain region is displayed on a map image of the certain region in an overlapping manner. In this example, the electric facility map is a map (pole map) image in which electric pole positional information indicating respective positions of the plurality of electric poles existing in the certain region is displayed on the map image of the certain region.

Note that the information indicating the respective positions of the plurality of electric poles in the electric facility map is correlated to electric pole identification information to identify the electric poles. Furthermore, information indicating a position of an electric pole in the electric facility map is, for example, information indicating a latitude and a longitude, but may also be other information. Moreover, the information indicating the position of the electric pole in the electric facility map may also include other information related to the electric pole position, such as information indicating an altitude.

Additionally, the distribution line map is a map image in which the electric pole positional information indicating the respective positions of the plurality of electric poles existing in the certain region and information indicating a connection route from a specific electric pole to another electric pole are displayed in an overlapping manner. Note that the electric pole positional information in the electric facility map and the electric pole positional information in the distribution line map are the same information. Furthermore, in the distribution line map, the electric pole positional information indicating the respective positions of the plurality of electric poles existing in the certain region and the information indicating the connection route from the specific electric pole to another electric pole may also be displayed in an overlapping manner. In this case, only the distribution line map is displayed on the map P1. The distribution line map is an example of a line map.

Note that, in this example, the connection route indicates a power transmission route connected by a power transmission line intended to connect an electric pole to an electric pole, but the connection route may also be other routes such as a communication cable. Furthermore, the information indicating the respective positions of the plurality of electric poles in the distribution line map is correlated to the electric pole identification information to identify the electric poles. Furthermore, the information indicating the respective positions of the plurality of electric poles in the distribution line map is, for example, information indicating a latitude and a longitude, but may also be other information. Moreover, the information indicating the respective positions of the electric poles in the distribution line map may also include other information related to the electric pole position, such as information indicating an altitude.

On the map P1 illustrated in FIG. 2, a mark indicating an electric pole position is displayed. For example, circles T1 to T9 on the map P1 respectively indicate positions of electric pole positions. In the following description, the electric poles at the positions respectively indicated by the circles T1 to T9 will be referred to as electric poles T1 to T9 for convenience of explanation.

Here, a description will be provided for a case where the electric pole T4 is an electric pole currently under the inspection work by the user. In the following description, the electric pole currently under the inspection work by the user will be referred to as a subject electric pole. On the map P1, a sign N to indicate a subject electric pole is displayed at the electric pole T4. In FIG. 2, the sign N is a rectangular mark enclosing the electric pole T4, but may also have another size and another shape. Furthermore, on the map P1, the subject electric pole may also be differentiated from other electric poles by colors, variation of lighting states (blinking, flickering, etc.), and so on.

Here, a case where the electric pole T2 and the electric pole T3 are respectively electric poles finished with inspection will be described. On the map P1, the electric poles finished with inspection are displayed with signs to indicate that inspection has been finished, like a sign S1 and a sign S2. The sign S1 is a sign to indicate that the electric pole T2 is the electric pole finished with inspection. The sign S2 is a sign to indicate that the electric pole T3 is the electric pole finished with inspection.

In FIG. 2, the sign S1 has a star-shaped mark enclosing the electric pole T2, but may also have another shape and another size. Furthermore, in the map P1, the electric pole finished with inspection may also be differentiated from other electric poles by colors, variation of lighting states (blinking, flickering, etc.), and so on. Note that the description for the sign S2 will be omitted as is the same with the sign S1. Furthermore, the signs to indicate the electric poles finished with inspection may also be signs that can identify the order of finishing inspection relative to the plurality of the electric poles finished with inspection.

Furthermore, on the map P1, in the case where an adjacent electric pole connected to a specific electric pole finished with inspection by a connection route is an electric pole finished with inspection, a display state of the connection route is changed. In FIG. 2, the connection route between the electric pole T2 finished with inspection and the electric pole T3 finished with inspection is changed to a thick line L different from other connection routes. Meanwhile, the display state of the connection route may also be changed by, for example, changing a color of a line segment indicating the connection route, changing a lighting state (blinking, flickering, etc.) of the line segment, changing a shape of the line segment, etc. instead of change to the thick line.

Meanwhile, on the map P1, either the electric facility map or the distribution line map may also be displayed instead of displaying the electric facility map and the distribution line map in an overlapping manner. In the case where only the electric facility map is displayed, only a connection route between electric poles finished with inspection is indicated in the display of the connection route between the electric poles. Furthermore, on the map P1, either the electric facility map or the distribution line map may also be displayed translucently when the maps are displayed in an overlapping manner.

When photographing operation to push the photographing button B1 is performed by the user, an image captured by an imager included in the information processing terminal 5 is displayed on the on-site photograph P2. Meanwhile, on the on-site photograph P2, other information may also be displayed together, such as information based on GPS information obtained from a global positioning system (GPS) sensor included in the information processing terminal 5, namely, information indicating a photographing angle of the user.

On the inspection item image P3, information indicating inspection items to be executed by the user relative to the subject electric pole is displayed in a list. In the example illustrated in FIG. 2, text information indicating respective inspection items from "Inspection Item 1" to "Inspection Item 4" is displayed in a list. As described above, the user performs inspection work to inspect a part or all of these inspection items.

Furthermore, on the inspection item image P3, a check box (radio box) correlated to the text information indicating each of the inspection items is displayed. In these check boxes, a check mark is displayed in a check box of an inspection item finished with inspection when selecting operation is performed by the user. For example, when the user performs selecting operation relative to a check box corresponding to an inspection item finished with inspection, the check mark is displayed in the inspection item finished with inspection. In FIG. 2, a check mark indicating that the "Inspection Item 1" is finished with inspection is displayed as a black circle in a check box C1 correlated to the "Inspection Item 1".

Furthermore, on the inspection item image P3, the inspection complete button B2 is displayed. When completing operation to push the inspection complete button B2 is received from the user, the information processing terminal 5 transmits, as inspection result information indicating inspection results, information correlating information indicating each of the inspection items displayed with the check marks in the check boxes to the information indicating captured image displayed on the on-site photograph P2, to the information processor 2.

Thus, the information processing system 1 causes the information processing terminal 5 to display, on the map P1, the information indicating the electric pole finished with inspection, and in the case where an adjacent electric pole connected the electric pole finished with inspection by a connection route is an electric pole finished with inspection, the information processing system 1 changes the display state of the connection route displayed on the information processing terminal 5. This enables the user not only to easily grasp an electric pole not finished with the inspection work but also to easily grasp the connection route between the electric poles finished with inspection. As a result, the information processing system 1 can improve efficiency of patrol/inspection for the electric pole (i.e., electric facility).

In the following description, note that a display screen before receiving the completing operation by the user will be referred to as a first display screen, and a display screen after receiving the completing operation by the user will be referred to as a second display screen for convenience of explanation. Furthermore, in the following description, the first display screen and the second display screen will be simply referred to as display screens unless otherwise needed to be discriminated.

Moreover, on the display screen P, a text box in which the user inputs information indicating remarks and the like may also be displayed. In this case, by receiving the completing operation, the information processing terminal 5 generates the inspection result information in which the information input in the text box is correlated to: the information indicating each of the inspection items displayed with the check marks in the check boxes; and the information indicating the captured image displayed on the on-site photograph P2. Additionally, although not illustrated in FIG. 2, information related to the subject electric pole (at least a part of information included in the facility information) may also be displayed on the display screen P.

Figure 3:
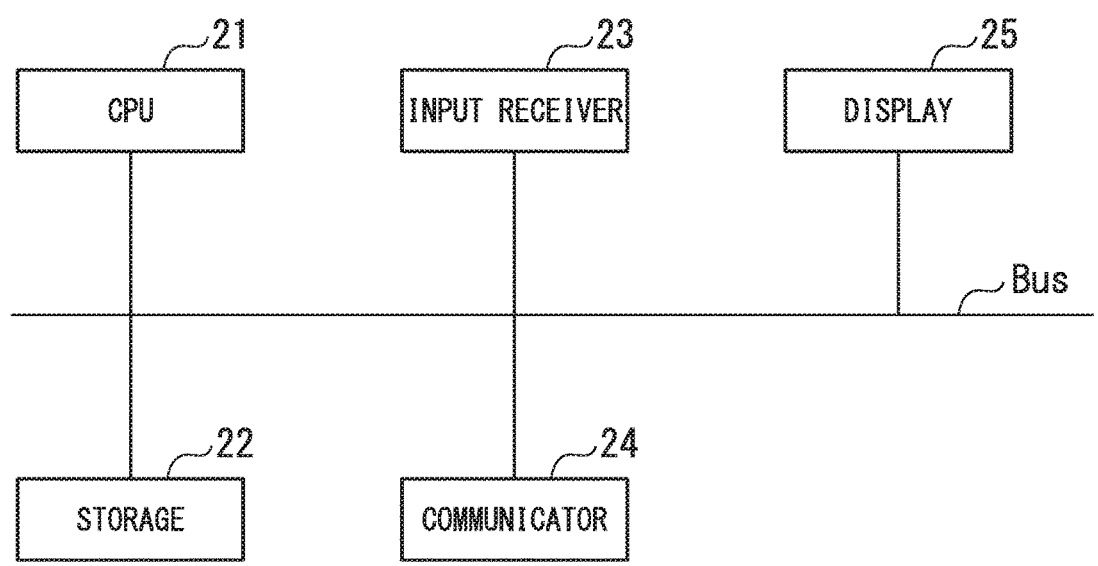
FIG. 3 is a diagram illustrating an exemplary hardware configuration of an information processor.

Next, a hardware configuration of the information processor 2 will be described with reference to FIG. 3. FIG. 3 is a diagram illustrating an exemplary hardware configuration of the information processor 2. The information processor 2 includes, for example, a central processing unit (CPU) 21, a storage 22, an input receiver 23, a communicator 24, a display 25, and communicates with other devices via the communicator 24. These components are mutually connected via a bus in a communicable manner. The CPU 21 executes various kinds of programs stored in the storage 22.

The storage 22 includes, for example, a hard disk drive (HDD), a solid state drive (SSD), an electrically erasable programmable read-only memory (EEPROM), a read-only memory (ROM), a random access memory (RAM), etc. and stores various kinds of information and images processed by the information processor 2, programs, and so on. Note that the storage 22 may be an external storage device connected by a digital input-output port such as a universal serial bus (USB) instead of being incorporated in the information processor 2.

The input receiver 23 includes, for example, a keyboard, a mouse, a touch pad, and other input devices. Note that the input receiver 23 may also be formed as a touch panel integrated with the display 25.

The communicator 24 is formed by including, for example, a digital input-output port such as an USB, an Ethernet (registered trademark) port, and the like.

The display 25 is, for example, a liquid crystal display panel or an electro luminescence (EL) display panel.

Figure 4:
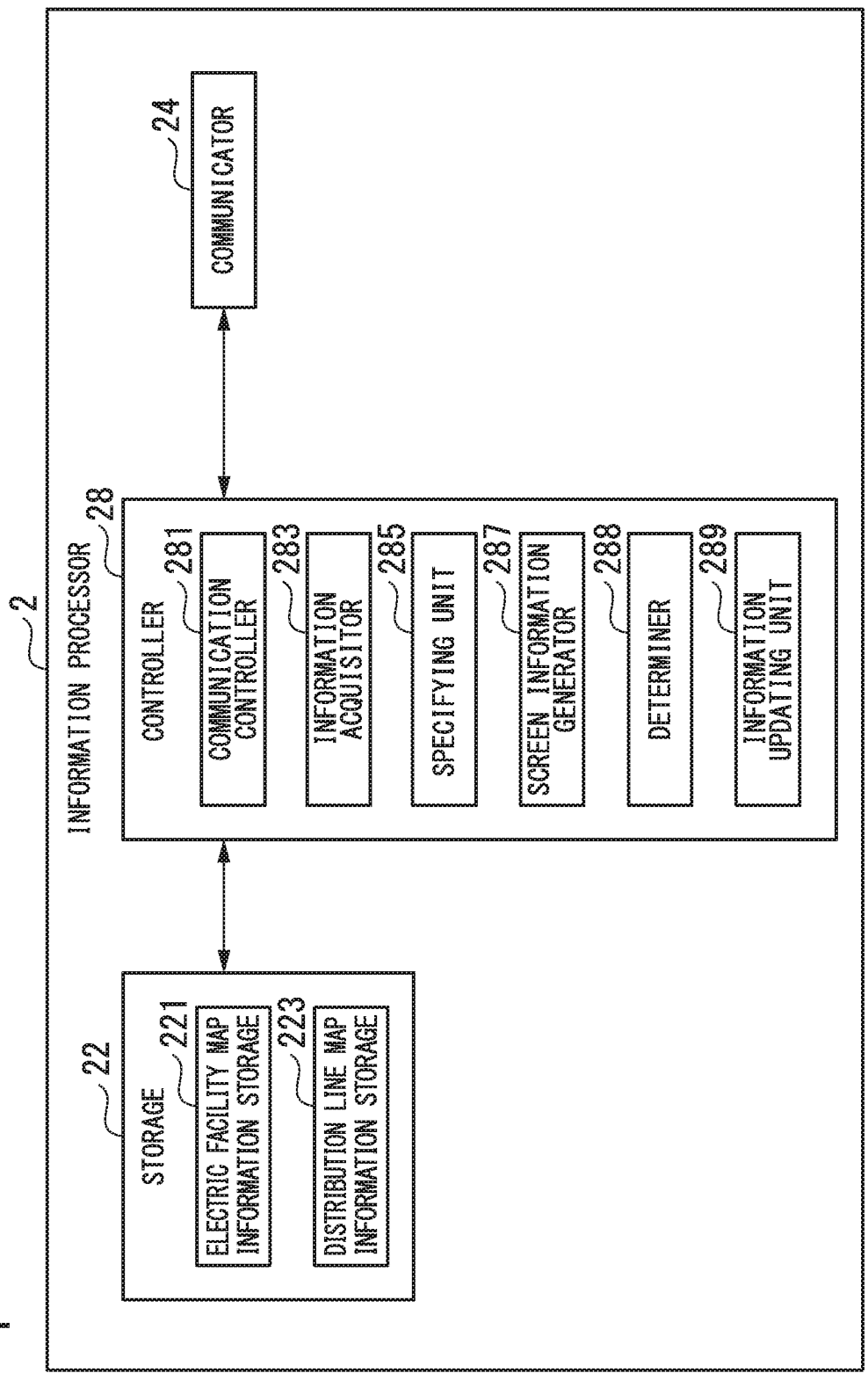
FIG. 4 is a diagram illustrating an exemplary functional configuration of the information processor.

Next, a functional configuration of the information processor 2 will be described with reference to FIG. 4. FIG. 4 is a diagram illustrating an exemplary functional configuration of the information processor 2. The information processor 2 includes the storage 22, the communicator 24, and a controller 28. A part or all of functional components included in the controller 28 is implemented by, for example, the CPU 21 executing the various kinds of programs stored in the storage 22. Furthermore, a part or all of these functional components may also be hardware functional components such as a large scale integration (LSI) and an application specific integrated circuit (ASIC).

The storage 22 includes an electric facility map information storage 221 and a distribution line map information storage 223. The electric facility map information storage 221 stores electric facility map information indicating the above-described electric facility map. The distribution line map information storage 223 stores distribution line map information indicating the above-described distribution line map.

The controller 28 controls an entire portion of the information processor 2. The controller 28 receives terminal positional information from the information processing terminal 5 via the communicator 24. Furthermore, the controller 28 receives the inspection result information from the information processing terminal 5 via the communicator 24. The controller 28 includes a communication controller 281, an information acquisitor 283, a specifying unit 285, a screen information generator 287, a determiner 288, and an information updating unit 289.

The communication controller 281 transmits, to the information processing terminal 5, the display screen information generated by the screen information generator 287 and adapted to generate a display screen via the communicator 24.

In response to a request from the controller 28, the information acquisitor 283 acquires (reads), from the electric facility map information storage 221, the electric facility map information indicating the electric facility map of a region including a position indicated by the terminal positional information based on the terminal positional information indicating a position of the information processing terminal 5 received by the controller 28 from the information processing terminal 5. The terminal positional information is an exemplary information indicating the position of the information processing terminal. Furthermore, the information acquisitor 283 acquires, from the distribution line map information storage 223, distribution line map information indicating the distribution line map of the region including the position indicated by the terminal positional information based on the terminal positional information received by the controller 28 from the information processing terminal 5.

Furthermore, the information acquisitor 283 acquires the facility information per electric pole identification information (namely, per electric pole) from the facility information DB 3 based on a plurality of electric pole identification information included in one or both of the electric facility map information acquired from the electric facility map information storage 221 and the distribution line map information acquired from the distribution line map information storage 223. Moreover, the information acquisitor 283 acquires the inspection item information per electric pole identification information from the facility inspection information DB 4 based on the plurality of electric pole identification information included in one or both of the electric facility map information acquired from the electric facility map information storage 221 and the distribution line map information acquired from the distribution line map information storage 223.

The specifying unit 285 specifies (detects) a subject electric pole based on: the terminal positional information received by the controller 28 from the information processing terminal 5; and the electric pole positional information indicating the respective positions of the plurality of electric poles included in one or both of the electric facility map information acquired from the electric facility map information storage 221 and the distribution line map information acquired from the distribution line map information storage 223. Specifying the subject electric pole represents detecting the electric pole identification information correlated to the electric pole positional information of the subject electric pole.

The screen information generator 287 generates the display screen information that includes at least: the electric pole positional information and the electric pole identification information of the subject electric pole specified by the specifying unit 285; and the facility information of the subject electric pole, the inspection item information of the subject electric pole, the electric facility map information, and the distribution line map information acquired by the information acquisitor 283. The display screen information is the display screen information to generate the first display screen. In the following description, this display screen information will be referred to as first display screen information for convenience of explanation. Furthermore, the screen information generator 287 generates the display screen information to change a display state of the first display screen based on the generated first display screen information and the inspection result information acquired from the information processing terminal 5. In the following description, this display screen information will be referred to as second display screen information for convenience of explanation.

The determiner 288 reads, from the facility inspection information DB 4, the inspection item information correlated to the electric pole identification information of the subject electric pole included in the inspection result information based on the inspection result information received by the controller 28. Furthermore, the determiner 288 determines whether all of the inspection items included in the read inspection item information are finished with inspection based on the inspection result information received by the controller 28. In the case of determining that all of the inspection items are not finished with inspection, the determiner 288 transmits, to the information processing terminal 5, information indicating that all of the inspection items are not finished with inspection (hereinafter referred to as error information) via the communicator 24. Meanwhile, when the error information is received, the information processing terminal 5 displays the received error information. In contrast, in the case of determining that a part or all of the inspection items are finished with inspection, the determiner 288 allows the information updating unit 289 to update (overwrite in this case), in accordance with the inspection result information received by the controller 28, the inspection result information stored in the facility inspection information DB 4, namely, the inspection result information included in the inspection result information and correlated to the electric pole identification information currently under inspection.

The information updating unit 289 updates the inspection result information stored in the facility inspection information DB 4 in response to a request from the determiner 288. Note that updating the inspection result information executed by the information updating unit 289 includes, for example, generating, changing, and deleting the inspection result information.

Figure 5:
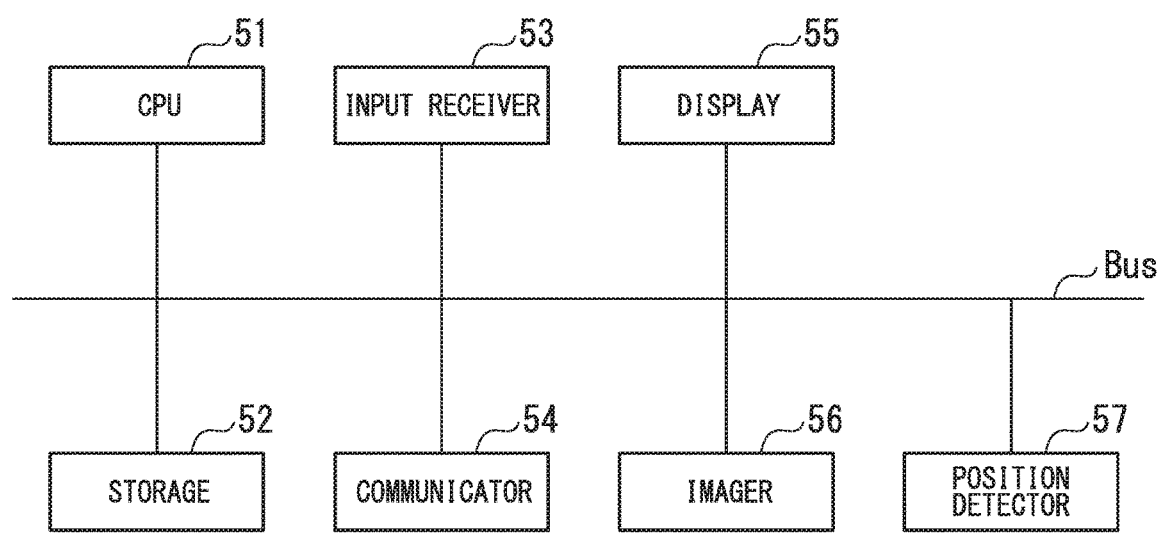
FIG. 5 is a diagram illustrating an exemplary hardware configuration of an information processing terminal.

Next, a hardware configuration of the information processing terminal 5 will be described with reference to FIG. 5. FIG. 5 is a diagram illustrating an exemplary hardware configuration of the information processing terminal 5. The information processing terminal 5 includes, for example, a CPU 51, a storage 52, an input receiver 53, a communicator 54, a display 55, an imager 56, and a position detector 57, and communicates with other devices via the communicator 54. These components are mutually connected via a bus in a communicable manner. The CPU 51 executes various kinds of programs stored in the storage 52.

The storage 52 includes a HDD, an SSD, an EEPROM, a ROM, a RAM, etc. and stores various kinds of information and images processed by the information processor 2, programs, and so on. Note that the storage 52 may be an external storage device connected by a digital input-output port such as a USB instead of being incorporated in the information processing terminal 5.

The input receiver 53 includes, for example, a keyboard, a mouse, a touch pad, and other input devices. Note that the input receiver 53 may also be formed as a touch panel integrated with the display 55.

The communicator 54 is formed by including, for example, a digital input-output port such as an USB, an Ethernet (registered trademark) port, and the like.

The display 55 is, for example, a liquid crystal display panel or an organic EL display panel.

The imager 56 is a camera provided with an imaging device to photoelectrically converting condensed light, namely, a charge coupled device (CCD), a complementary metal oxide semiconductor (CMOS), and so on.

The position detector 57 is a UPS sensor, for example, and acquires UPS information such as time information and satellite orbit data in order to calculate information of a latitude and a longitude where the information processing terminal 5 is located.

Figure 6:
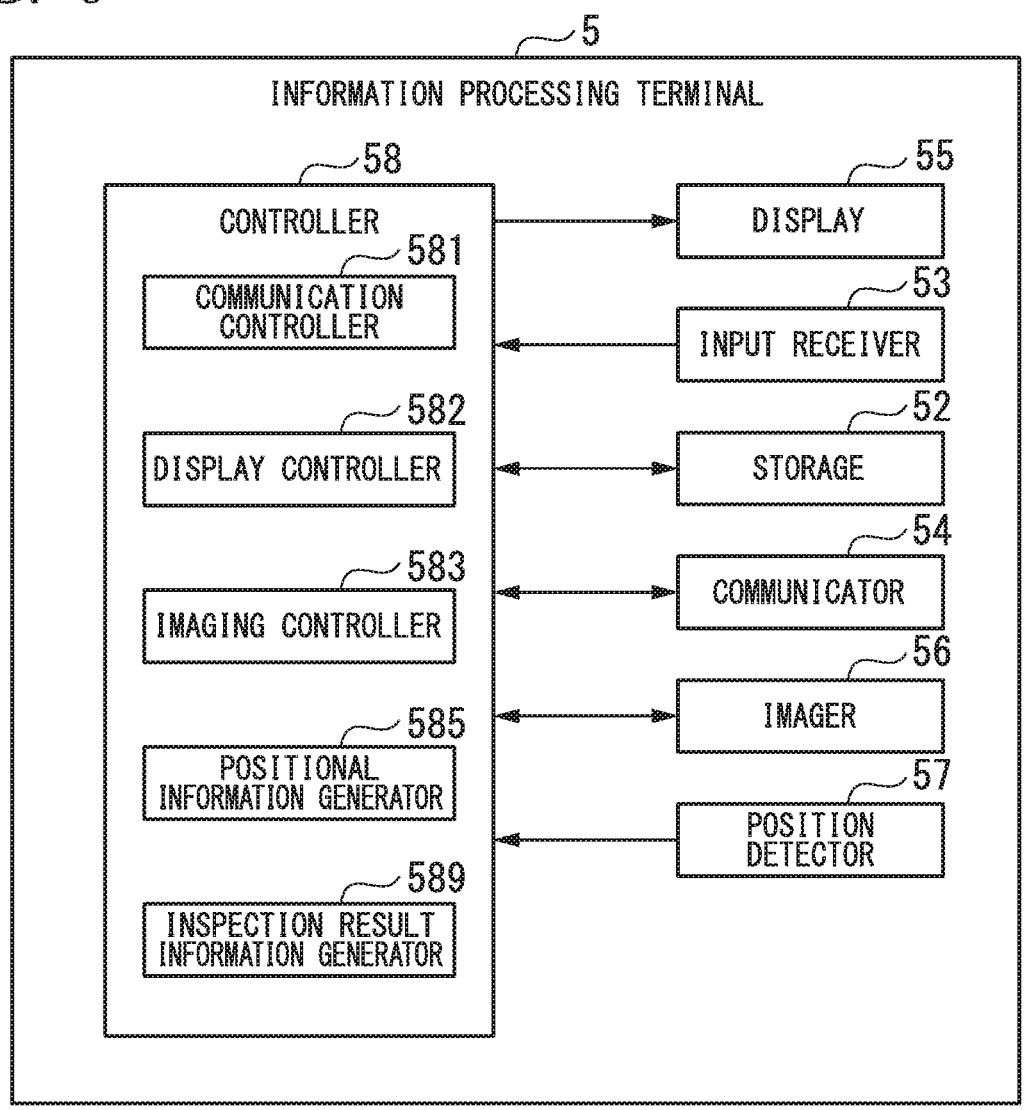
FIG. 6 is a diagram illustrating an exemplary functional configuration of the information processing terminal.

Next, a functional configuration of the information processing terminal 5 will be described with reference to FIG. 6. FIG. 6 is a diagram illustrating an exemplary functional configuration of the information processing terminal 5. The information processing terminal 5 includes the storage 52, input receiver 53, communicator 54, display 55, imager 56, position detector 57, and a controller 58. A part or all of functional components included in the controller 58 are implemented by, for example, the CPU 51 executing the various kinds of programs stored in the storage 52. Furthermore, a part or all of the functional components may also be hardware functional components such as an LSI and an ASIC.

The controller 58 controls an entire portion of the information processing terminal 5. The controller 58 includes a communication controller 581, a display controller 582, an imaging controller 583, a positional information generator 585, and an inspection result information generator 589.

The communication controller 581 transmits the terminal positional information generated by the positional information generator 585 to the information processor 2 via the communicator 54. Furthermore, the communication controller 581 transmits the inspection result information generated by the inspection result information generator 589 to the information processor 2 via the communicator 54.

The display controller 582 controls the display 55 to display the first display screen based on the first display screen information acquired from the information processor 2 via the communicator 54. Furthermore, the display controller 582 controls the display 55 to display the second display screen having the display state changed from the first display screen based on the second display screen information acquired from the information processor 2 via the communicator 54. Furthermore, the display controller 582 superimposes a captured image on the display screen based on the captured image acquired from the imager 56. For example, the display controller 582 superimposes the captured image acquired from the imager 56 on the on-site photograph P2 of the display screen P.

The imaging controller 583 controls the imager 56 to capture an image of a photographable range.

The positional information generator 585 acquires the GPS information from the position detector 57. Furthermore, the positional information generator 585 generates the terminal positional information indicating the position of the information processing terminal 5 based on the acquired GPS information. Meanwhile, the terminal positional information is the information indicating a latitude and a longitude of the information processing terminal 5, and besides this, may also include information indicating an altitude of the information processing terminal 5 and information indicating a lens orientation angle of the imager 56 of the information processing terminal 5.

The inspection result information generator 589 generates the inspection result information based on operation received from the user by the input receiver 53 via the display screen displayed on the display 55.

Figure 7:
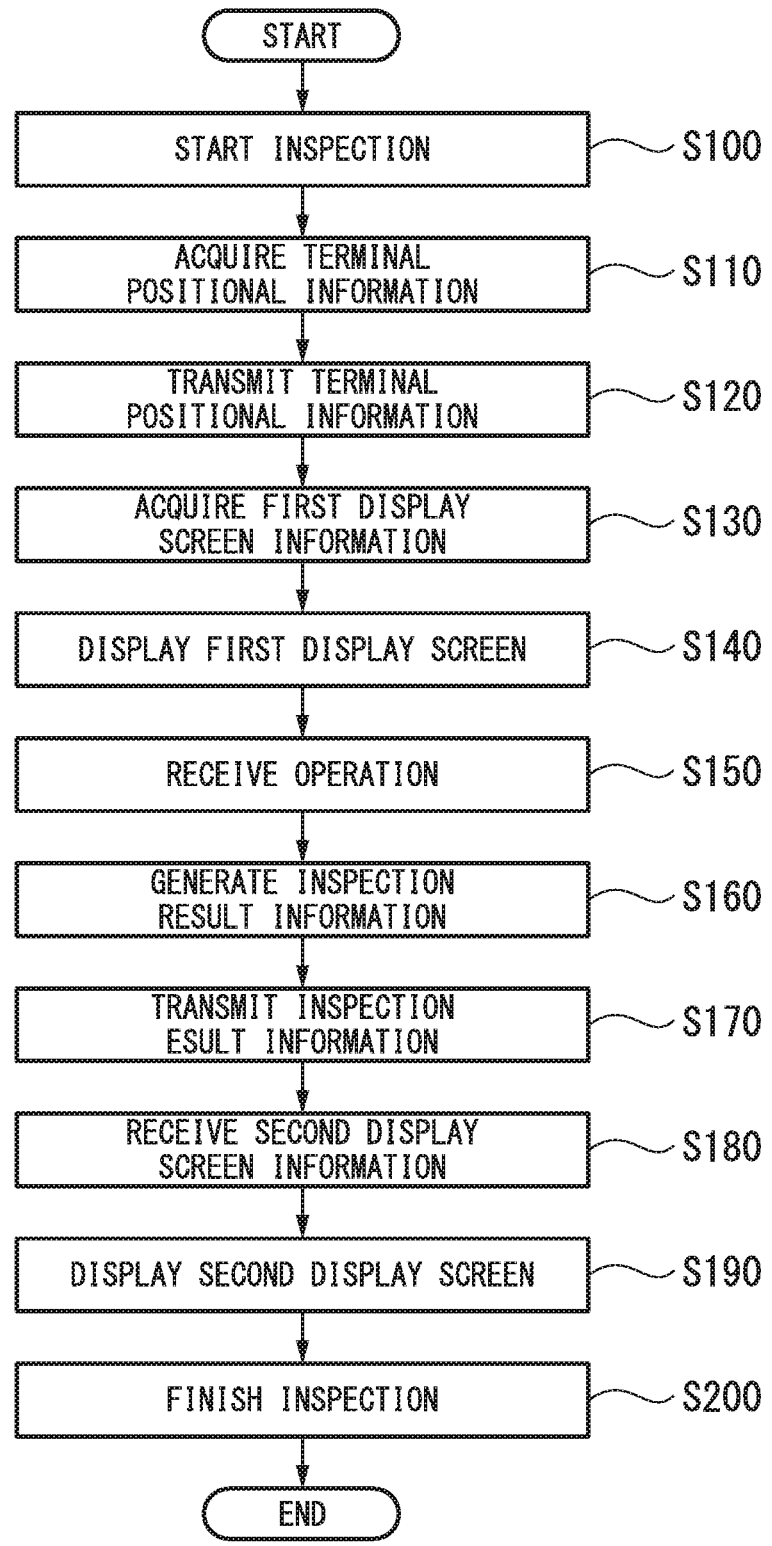
FIG. 7 is a flowchart illustrating an exemplary flow of processing executed by an information processing terminal 5 from start of inspection work to finish of the inspection work by the user.

In the following, processing executed by the information processing terminal 5 from start of inspection work to finish of the inspection work by the user will be described with reference to FIG. 7. FIG. 7 is a flowchart illustrating an exemplary flow of the processing executed by the information processing terminal 5 from start of the inspection work to finish of the inspection work by the user. In the flowchart of FIG. 7, a description will be given for a case where the GUI is already displayed on the display 55 of the information processing terminal 5.

First, the controller 58 receives, by the input receiver 53, inspection work start operation to start the inspection work from the user via the GUI displayed on the display 55 (Step S100). Next, the positional information generator 585 acquires the GPS information from the position detector 57. The positional information generator 585 generates the terminal positional information based on the acquired GPS information (Step S110).

Next, the communication controller 581 transmits the terminal positional information generated by the positional information generator 585 in Step S110 to the information processor 2 via the communicator 54 (Step S120). Next, the controller 58 receives the first display screen information from the information processor 2 via the communicator 54 (Step S130).

Subsequently, the display controller 582 controls the display 55 to display the first display screen based on the first display screen information received by the controller 58 in Step S130 (Step S140). The display controller 582 controls the display 55 to display, for example, the display screen P illustrated in FIG. 2.

Next, the controller 58 receives, by the input receiver 53, operation related to the inspection work from the user via the GUI displayed on the display 55 (Step S150). The operation related to the inspection work represents, for example, selecting operation to select each of the check boxes of the plurality of inspection items illustrated in FIG. 2 (fill a check mark in a check box), an imaging operation to capture an image of the electric pole currently under the user's inspection with the imager 56 and display the captured image as the on-site photograph P2, completing operation to push the inspection complete button B2, and so on.

In the following, a description will be provided for a case where the user displays the check marks in the check boxes of a part or all of the inspection items illustrated in FIG. 2, displays the captured image as the on-site photograph P2, and then performs the completing operation to push the inspection complete button B2 in Step S150.

Next, the inspection result information generator 589 generates the inspection result information based on the completing operation received from the user in Step S150 (Step S160). For example, in the case where the check marks are displayed in all of the check boxes illustrated in FIG. 2, the inspection result information is the information in which correlation is made among: the information indicating the inspection item correlated to the check box in which a check mark is displayed as the information indicating completion of inspection; the information indicating the captured image displayed as the on-site photograph P2; and the electric pole identification information of the subject electric pole included in the display image information received by the controller 58 in Step S130. Note that other information may also be included in the inspection result information.

Next, the communication controller 581 transmits the inspection result information generated by the inspection result information generator 589 in Step S160 to the information processor 2 via the communicator 54 (Step S170). Next, the controller 58 receives the second display screen information from the information processor 2 via the communicator 54 (Step S180).

Next, the display controller 582 controls the display 55 to display the second display screen based on the second display screen information received by the controller 58 in Step S180 (Step S190). Next, the controller 58 receives, by the input receiver 53, inspection finish operation to finish the inspection work from the user via the GUI displayed on the display 55 (Step S200). Consequently, the controller 58 finishes the processing from Step S100 to Step S200.

Figure 8:
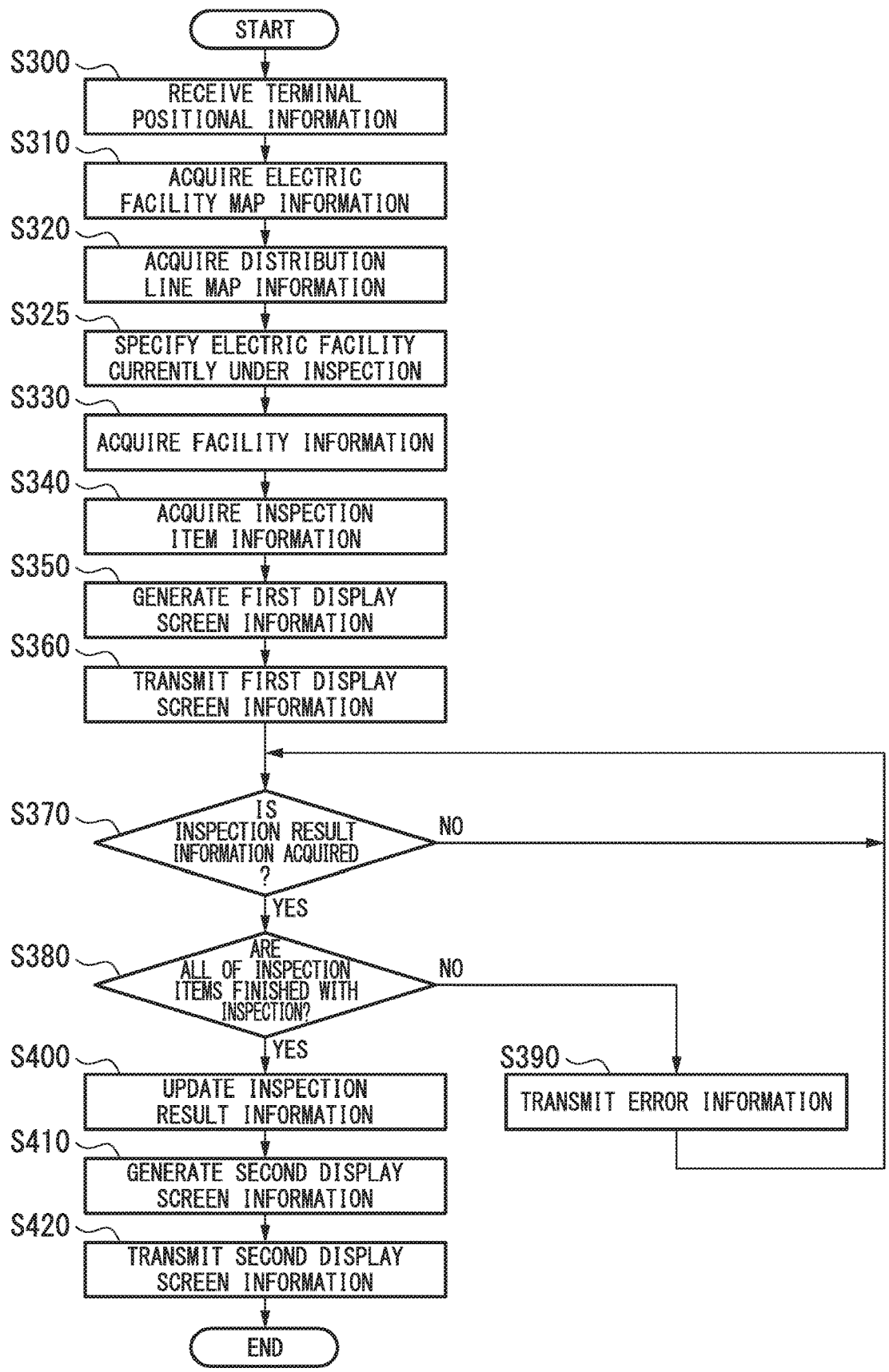
FIG. 8 is a flowchart illustrating an exemplary flow of processing executed by a controller of the information processor while the processing from Step S100 to Step S200 is executed by the information processing terminal.

In the following, the processing executed by a controller 28 of the information processor 2 while the processing from Step S100 to Step S200 is executed by the information processing terminal 5 will be described with reference to FIG. 8. FIG. 8 is a flowchart illustrating an exemplary flow of the processing executed by the controller 28 of the information processor 2 while the processing from Step S100 to Step S200 is executed by the information processing terminal 5.

First, the controller 28 receives the terminal positional information from the information processing terminal 5 via the communicator 24 (Step S300). Next, the information acquisitor 283 acquires, from the electric facility map information storage 221, the electric facility map information of the region including the position indicated by the terminal positional information based on the terminal positional information received by the controller 28 from the information processing terminal 5 in Step S300 (Step S310). Meanwhile, the information acquisitor 283 may also have a configuration of acquiring the electric facility map information of a whole country instead of the configuration of acquiring, from the electric facility map information storage 221, the electric facility map information of the region including the position indicated by the positional information.

Next, the information acquisitor 283 acquires, from the distribution line map information storage 223, the distribution line map information of the region including the position indicated by the terminal positional information based on the terminal positional information received by the controller 28 from the information processing terminal 5 in Step S300 (Step S320). Meanwhile, the information acquisitor 283 may also have a configuration of acquiring the distribution line map information of a whole country instead of the configuration of acquiring, from the distribution line map information storage 223, the distribution line map information of the region including the position indicated by the terminal positional information.

Next, the specifying unit 285 specifies the subject electric pole based on information shown below in A) to B) (Step S325).

A) Terminal positional information received by the controller 28 from the information processing terminal 5 in Step S300

B) Electric pole positional information indicating the respective positions of the plurality of electric poles included in one or both of the electric facility map information acquired from the electric facility map information storage 221 in Step S310 and the distribution line map information acquired from the distribution line map information storage 223 in Step S320

Here, processing of the specifying unit 285 to specify the subject electric pole will be described. The specifying unit 285 extracts an electric pole having a position indicated by the terminal positional information within a predetermined range based on the electric pole positional information indicating the respective positions of the plurality of electric poles included in one or both of the electric facility map information and the distribution line map information. The predetermined range represents a range including a position of a specific electric pole and represents, for example, a round-shaped range centering the position of the specific electric pole and having a diameter 10 meters or less. Note that the predetermined range may also have another shape and another size. The specifying unit 285 specifies (detects) the electric pole identification information correlated to the electric pole positional information of the extracted electric pole as the electric pole identification information of the subject electric pole.

Next, the information acquisitor 283 acquires, from the facility information DB 3, the facility information correlated to the electric pole identification information based on the electric pole identification information of the subject electric pole specified by the specifying unit 285 in Step S325 (Step S330).

Here, the facility information will be described with reference to FIG. 9. FIG. 9 is a diagram illustrating exemplary information included in the facility information stored in the facility information DB 3. As illustrated in FIG. 9, the facility information includes: a start code to identify a branch of an electric company that owns electric facilities for each kind of the electric facilities (listed as EQUIPMENT in Step S9); electric facility identification information to identify the electric facility (for example, in the case where the electric facility is an electric pole, electric pole identification information); information indicating a type of the electric facility; information indicating a manufacturing year of the electric facility; information indicating a manufacturer of the electric facility; and information indicating a year when the electric facility is installed. Furthermore, in the information indicating the type of the electric facility, information indicating a size, a shape, etc. of the electric facility are included. Note that the facility information may also include other information related to the electric facility.

Next, the information acquisitor 283 acquires, from the facility inspection information DB 4, the inspection item information correlated to the electric pole identification information based on the electric pole identification information of the subject electric pole specified by the specifying unit 285 in Step S325 (Step S340).

Here, the inspection item information will be described with reference to FIG. 10. FIG. 10 is a diagram illustrating exemplary information included in the inspection item information stored in the facility inspection information DB 4. As illustrated in FIG. 10, the inspection item information includes, per electric facility (electric pole in this example): the electric facility identification information (electric pole identification information in this example) that identifies the electric facility; and information indicating one or more inspection items correlated to each of the electric facility identification information.

Next, the screen information generator 287 generates the first display screen information that includes at least the terminal positional information acquired in the processing from Step S310 to Step S340, the electric facility identification information, the distribution line map information, the facility information of the subject electric pole, and the inspection item information of the subject electric pole (Step S350).

Next, the communication controller 281 transmits the first display screen information generated by the screen information generator 287 in Step S350 to the information processing terminal 5 via the communicator 24 (Step S360). Next, the controller 58 waits until the inspection result information is acquired from the information processing terminal 5 (Step S370).

In the case where the controller 28 acquires the inspection result information from the information processing terminal 5 in Step S370, the determiner 288 determines whether all of the inspection items are finished with inspection relative to the electric pole specified by the specifying unit 285 in Step S325 (Step S380). The determiner 288 gives this determination by comparing the inspection item information acquired by the information acquisitor 283 in Step S340 with the inspection result information received by the controller 28 from the information processing terminal 5 in Step S370.

In the case of determining in Step S325 that all of the inspection items are not finished with inspection relative to the subject electric pole specified by the specifying unit 285 (Step S380: No), the determiner 288 transmits error information to the information processing terminal 5 via the communicator 24 (Step S390), and the controller 28 proceeds to Step S370 and waits until the inspection result information is received again from the information processing terminal 5. On the other hand, in the case of determining in Step S325 that all of the inspection items are finished with inspection relative to the subject electric pole specified by the specifying unit 285 (Step S380: Yes), the determiner 288 allows the information updating unit 289 to update, based on the inspection result information received by the controller 28 in Step S370, the inspection result information stored in the facility inspection information DB 4, namely, the inspection result information related to the subject electric pole specified by the specifying unit 285 in Step S325 (Step S400).

Next, the screen information generator 287 generates, based on the inspection result information received by the controller 28 in Step S370, the second display screen information to change the display state of the first display screen generated by the first display screen information generated in Step S350 (Step S410).

The second display screen on which the display state of the first display screen is changed is, more specifically, the screen on which a sign indicating an electric pole finished with inspection (such as sign S1 and sign S2 in FIG. 2) is displayed at the position of the subject electric pole on the first display screen, namely, the position of the subject electric pole specified by the specifying unit 285 in Step S325. Furthermore, the second display screen on which the display state of the first display screen is changed is the screen on which a display state of a connection route is changed in the case where an adjacent electric pole connected, by the connection route, to the subject electric pole newly finished with inspection is finished with inspection.

Next, the communication controller 281 transmits the second display screen information generated by the screen information generator 287 in Step S410 to the information processing terminal 5 via the communicator 24 (Step S420).

Figure 11:
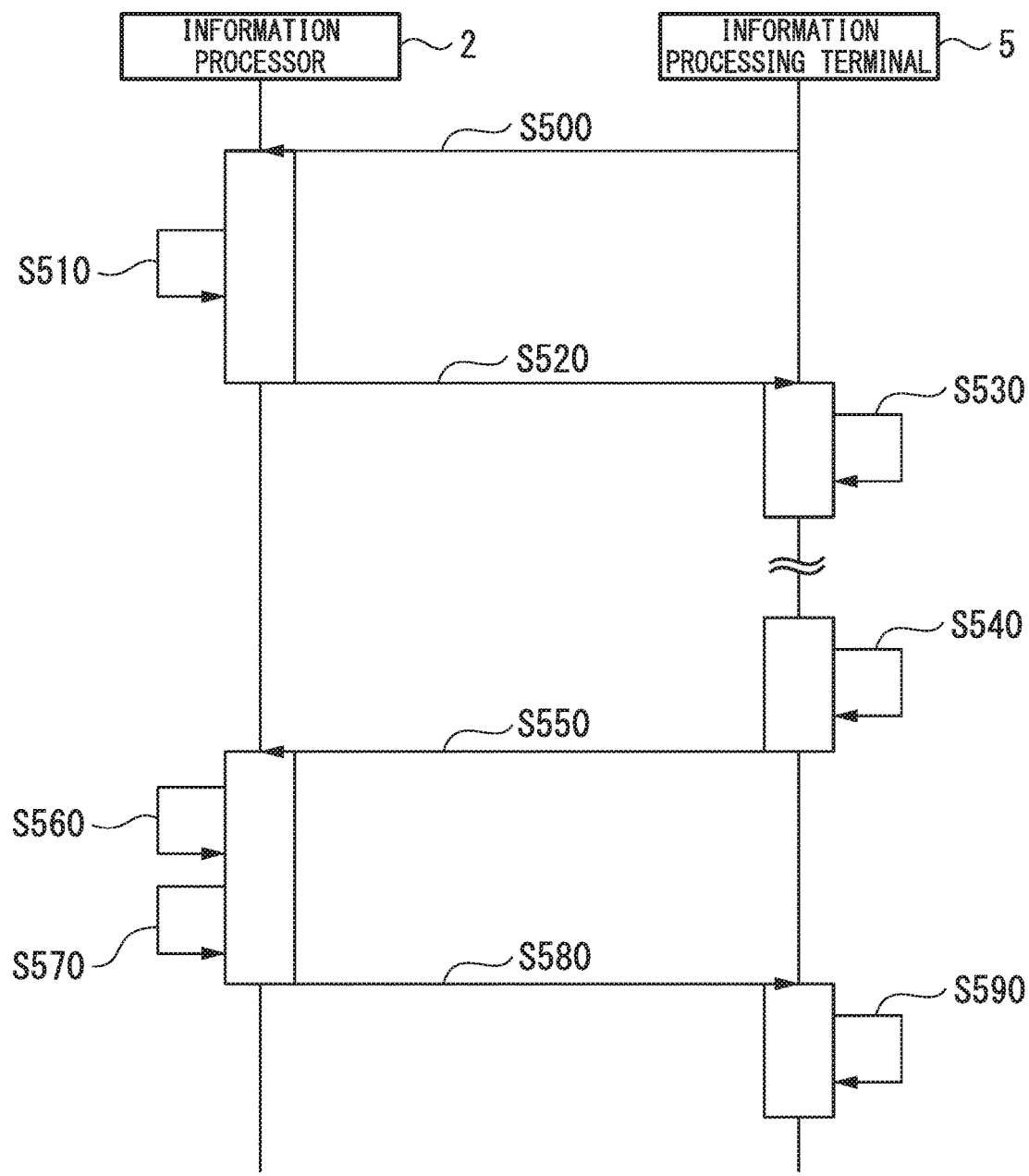
FIG. 11 is a sequence diagram illustrating an exemplary processing flow between the information processor and the information processing terminal in the information processing system.

In the following, processing between the information processor 2 and the information processing terminal 5 in the information processing system 1 will be described with reference to FIG. 11. FIG. 11 is a sequence diagram illustrating an exemplary processing flow between the information processor 2 and the information processing terminal 5 in the information processing system 1. In the sequence diagram of FIG. 11, note that a description will be given for a case where the GUI is already displayed on the display 55 of the information processing terminal 5.

First, the information processing terminal 5 generates the terminal positional information based on inspection start operation from the user received by the input receiver 53 via the GUI. Furthermore, the information processing terminal 5 transmits the terminal positional information to the information processor 2 (Step S500).

Next, the information processor 2 generates the first display screen information based on the terminal positional information received from the information processing terminal 5 (Step S510). Next, the information processor 2 transmits the first display screen information generated in Step S510 to the information processing terminal 5 (Step S520).

Next, the information processing terminal 5 receives the first display screen information from the information processor 2. Furthermore, the information processing terminal 5 displays the first display screen based on the received first display screen information (Step S530). In the following, a description will be given for a case where the information processing terminal 5 receives, by the input receiver 53, the operation related to the inspection work and then the completing operation from the user via the GUI displayed on the display 55 of the information processing terminal 5 after the processing in Step S530.

After the completing operation is performed by the user, the information processing terminal 5 generates the inspection result information (Step S540). Next, the information processing terminal 5 transmits the inspection result information generated in Step S540 to the information processor 2 (Step S550).

Next, the information processor 2 receives the inspection result information from the information processing terminal 5 (Step S560). Next, the information processor 2 determines whether all of the inspection items relative to the subject electric pole are finished with inspection based on the inspection result information received in Step S560 (Step S560). In the following, a description will be given for a case where the information processor 2 determines that all of the inspection items relative to the subject electric pole are finished with inspection in Step S560.

Next, the information processor 2 generates the second display screen information based on the inspection result information received from the information processing terminal 5 in Step S560 (Step S570). Furthermore, in Step S570, the information processor 2 updates the inspection result information stored in the facility inspection information DB 4, namely, the inspection result information related to the subject electric pole based on the inspection result information received from the information processing terminal 5 in Step S560.

Next, the information processor 2 transmits the second display screen information generated in Step S570 to the information processing terminal 5 (Step S580). Next, the information processing terminal 5 receives the second display screen information from the information processor 2. Furthermore, the information processing terminal 5 displays the second display screen based on the received second display screen information (Step S590).

As described above, the information processing system 1 specifies an electric facility to be an inspection target (for example, subject electric pole in Embodiment 1) based on: information indicating the positions of the plurality of electric facilities (for example, electric facility positional information in Embodiment 1) included in a line map that includes information indicating the positions of the plurality of electric facilities (for example, the electric poles in Embodiment 1) and information indicating the connection route between the electric facilities (for example, the distribution line map in Embodiment 1); and information (for example, the terminal positional information in Embodiment 1) indicating the position of the information processing terminal (for example, the information processing terminal 5 in Embodiment 1). Then, the information processing system 1 controls the information processing terminal to display the information indicating that the electric facility is finished with inspection on the line map based on the information indicating the inspection result of the specified electric facility to be the inspection target (for example, the inspection result information in Embodiment 1), and in the case where the adjacent electric facility connected to the electric facility by the connection route is finished with inspection, the display change processing to change the display state of the connection route displayed on the information processing terminal is performed.

Furthermore, the information processing system 1 stores line map information indicating the line map (for example, the distribution line map in Embodiment 1), and reads the stored line map information, and specifies the electric facility to be the inspection target based on the information indicating the positions of the plurality of electric facilities included in the read line map information.

Moreover, the information processing system 1 generates first display image information indicating a first display image to be displayed by the information processing terminal based on the information indicating the positions of the plurality of electric facilities included in the line map and the information indicating the position of the specified electric facility to be the inspection target. Furthermore, the information processing system 1 generates second display image information to change the display state of the first display image based on the information indicating the inspection result of the electric facility to be the inspection target, controls the information processing terminal to display the first display image based on the generated first display image information, and performs the display change processing on the first display image based on the generated second display image information.

Additionally, the information processing system 1 determines whether all of the inspection items relative to the electric facility to be the inspection target is finished with inspection. In the case where a part or all of the inspection items are finished with inspection, the information processing system performs the display change processing, and in the case where all of the inspection items are not finished with inspection, the information processing system controls the information processing terminal to display the information indicating the error.

As described above, the information processing system 1 according to the present embodiment specifies the electric facility to be the inspection target based on: the information indicating the position of the plurality of electric facilities included in the distribution line map that includes information (electric pole positional information in this example) indicating the positions of the plurality of electric facilities (electric poles in this example) and the information indicating the connection route between the electric facilities; and the information indicating the position of the information processing terminal 5 (terminal positional information in this example). The information processing system 1 controls the information processing terminal 5 to display the information indicating that the electric facility is finished with inspection on the distribution line map based on the inspection result information indicating the inspection result of the specified electric facility, and in the case where the adjacent electric facility connected to the electric facility by the connection route is finished with inspection, the information processing system 1 changes the display state of the connection route displayed on the information processing terminal 5. This enables the information processing system 1 to improve efficiency of patrol/inspection for the electric facility.

Meanwhile, the information processing system 1 may also specify the electric pole identification information of the subject electric pole by, for example, receiving the user's selecting operation for the electric pole from among the plurality of electric poles on the map P1 displayed on the display 55 of the information processing terminal 5 instead of the configuration of specifying the electric pole identification information of the subject electric pole based on the terminal positional information and the electric pole positional information indicating the respective positions of the plurality of electric poles included in one or both of the electric facility map information and the distribution line map information. In this case, the information processing terminal 5 transmits, to the information processor 2, the electric pole positional information indicating the position of the electric pole selected on the map P1. Furthermore, based on the received selected electric pole positional information, the information processor 2 extracts the electric pole positional information closest to the position indicated by the selected electric pole positional information from among the electric pole positional information indicating the respective positions of the plurality of electric poles included in one or both of the electric facility map information and the distribution line map information, and detects (specifies) the electric pole identification information correlated to the extracted electric pole positional information as the electric pole identification information of the subject electric pole.

Furthermore, the information processing terminal 5 may also have a configuration in which a part or all of the functional components included in the information processor 2 are provided. For example, in the case where all of the functional components included in the information processor 2 are provided, the information processing terminal 5 communicates with the facility information DB 3 and the facility inspection information DB 4 by wireless communication.

As described above, the embodiment of the present invention has been described in detail with reference to the drawings, but the concrete configuration is not limited to the embodiment, and modification, replacement, deletion, etc. may also be made without departing from the gist of the present invention.

Furthermore, a program to implement a function of an optional functional component of the above-described devices (for example, the information processor 2 and the information processing terminal 5 of the information processing system 1) may be recorded in a computer-readable recording medium (such as a non-temporary recording medium), and the program may also be executed by causing a computer system to read the program. Note that the "computer system" here includes hardware such as an operating system (OS), and a peripheral device. Furthermore, the "computer-readable recording medium" represents portable media such as a flexible disk, a magneto optical disk, a ROM, and a compact disk (CD)-ROM, and a storage device such as a hard disk included in the computer system. Moreover, the "computer-readable recording medium" includes a recording medium that holds a program for a predetermined period like a volatile memory (RAM) inside a computer system to be a server or a client in the case where a program is transmitted via a communication line such as a network like the Internet or a telephone line.

Additionally, the above-described program may also be transmitted to other computer systems via a transmission medium or transmitted waves in the transmission medium from the computer system that stores the program in a storage device and the like. Here, the "transmission medium" represents a medium having a function to transmit information like a network such as the Internet (communication network) or a communication line (communication wire) such as the telephone line.

Furthermore, the above-described program may also be provided to implement a part of the above-described functions. Furthermore, the above-described program may also be a so-called differential file (differential program) which can implement the above-described functions by being combined with a program already recorded in the computer system.

The apparatus, systems and methods in the above-described embodiments may be deployed in part or in whole through machines, a system of circuits, circuitry, hardware processors that executes computer software, software components, program codes, and/or instructions on one or more machines, a system of circuits, circuitry, hardware processors. In some cases, the one or more machines, a system of circuits, circuitry, hardware processors may be part of a general-purpose computer, a server, a cloud server, a client, network infrastructure, mobile computing platform, stationary computing platform, or other computing platform. One or more processors may be any kind of computational or processing device or devices which are capable of executing program instructions, codes, binary instructions and the like. The one or more hardware processors may be or include a signal processor, digital processor, embedded processor, microprocessor or any variants such as a co-processor, for example, math co-processor, graphic co-processor, communication co-processor and the like that may directly or indirectly facilitate execution of program codes or program instructions stored thereon. In addition, the one or more hardware processors may enable execution of multiple programs, threads, and codes. The threads may be executed simultaneously to enhance the performance of the one or more hardware processors and to facilitate simultaneous operations of the application. Program codes, program instructions and the like described herein may be implemented in one or more threads. The one or more hardware processors may include memory that stores codes, instructions and programs as described herein. The machines, a system of circuits, circuitry, hardware processors may access a non-transitory processor-readable storage medium through an interface that may store codes, instructions and programs as described herein and elsewhere. The non-transitory processor-readable storage medium associated with the machines, a system of circuits, circuitry, hardware processors for storing programs, codes, program instructions or other type of instructions capable of being executed by the computing or processing device may include but may not be limited to one or more of a memory, hard disk, flash drive, RAM, ROM, CD-ROM, DVD, cache and the like.

A processor may include one or more cores that may enhance speed and performance of a multiprocessor. In some embodiments, the process may be a dual core processor, quad core processors, other chip-level multiprocessor and the like that combine two or more independent cores.

The methods, apparatus and systems described herein may be deployed in part or in whole through a machine that executes computer software on a server, client, firewall, gateway, hub, router, or other such computer and/or networking hardware.

The software program may be associated with one or more client that may include a file client, print client, domain client, internet client, intranet client and other variants such as secondary client, host client, distributed client and the like. The client may include one or more of memories, processors, computer readable media, storage media, physical and virtual ports, communication devices, and interfaces capable of accessing other clients, servers, machines, and devices through a wired or a wireless medium, and the like. The programs or codes as described herein may be executed by the client. In addition, other devices required for execution of methods as described in this application may be considered as a part of the infrastructure associated with the client. The client may provide an interface to other devices including servers, other clients, printers, database servers, print servers, file servers, communication servers, distributed servers and the like. This coupling and/or connection may facilitate remote execution of program across the network. The networking of some or all of these devices may facilitate parallel processing of a program or method at one or more location. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The software program may be associated with one or more servers that may include a file server, print server, domain server, internet server, intranet server and other variants such as secondary server, host server, distributed server and the like. The server may include one or more of memories, processors, computer readable media, storage media, physical and virtual ports, communication devices, and interfaces capable of accessing other servers, clients, machines, and devices through a wired or a wireless medium, and the like. The methods, programs or codes as described herein may be executed by the server. In addition, other devices required for execution of methods as described in this application may be considered as a part of the infrastructure associated with the server. The server may provide an interface to other devices including clients, other servers, printers, database servers, print servers, file servers, communication servers, distributed servers, social networks, and the like. This coupling and/or connection may facilitate remote execution of program across the network. The networking of some or all of these devices may facilitate parallel processing of a program or method at one or more locations. Any of the devices attached to the server through an interface may include at least one storage medium capable of storing programs, codes and/or instructions. A central repository may provide program instructions to be executed on different devices. In this implementation, the remote repository may act as a storage medium for program codes, instructions, and programs.

The methods, apparatus and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing devices associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory, for example, USB sticks or keys, floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The modules, engines, components, and elements described herein, including in flow charts and block diagrams throughout the figures, imply logical boundaries between the modules, engines, components, and elements. However, according to software or hardware engineering practices, the modules, engines, components, and elements and the functions thereof may be implemented on one or more processors, computers, machines through computer executable media, which are capable of executing program instructions stored thereon as a monolithic software structure, as standalone software modules, or as modules that employ external routines, codes, services, or any combination of these, and all such implementations may be within the scope of the present disclosure. Examples of such machines may include, but is not limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, processor-embedded eyewear and the like. Furthermore, the modules, engines, components, and elements in the flow chart and block diagrams or any other logical component may be implemented on one or more machines, computers or processors capable of executing program instructions. Whereas the foregoing descriptions and drawings to which the descriptions have been referred set forth some functional aspects of the disclosed systems, no particular arrangement of software for implementing these functional aspects should be inferred from these descriptions unless explicitly stated or otherwise clear from the context. It will also be appreciated that the various steps identified and described above may be varied, and that the order of steps may be adapted to particular applications of the techniques disclosed herein. All such variations and modifications are intended to fall within the scope of this disclosure. The descriptions of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

As used herein, the following directional terms "front, back, above, downward, right, left, vertical, horizontal, below, transverse, row and column" as well as any other similar directional terms refer to those instructions of a device equipped with embodiments of the present invention. Accordingly, these terms, as utilized to describe embodiments of the present invention should be interpreted relative to a device equipped with embodiments of the present invention.

Each element for the system, device and apparatus described above can be implemented by hardware with or without software. In some cases, the system, device and apparatus may be implemented by one or more hardware processors and one or more software components wherein the one or more software components are to be executed by the one or more hardware processors to implement each element for the system, device and apparatus. In some other cases, the system, device and apparatus may be implemented by a system of circuits or circuitry configured to perform each operation of each element for the system, device and apparatus.

While the present disclosure includes many embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

What is claimed is:

1. An information processing system, comprising:
a specifying unit configured to specify an electric facility to be an inspection target based on: information indicating positions of a plurality of electric facilities included in a line map that includes information indicating the positions of the plurality of electric facilities and information indicating a connection route between the electric facilities; and information indicating a position of an information processing terminal; and
a display controller configured to control the information processing terminal to display a graphical user interface that displays the line map, the line map including i) the positions of the plurality of electric facilities, ii) the connection route between the electric facilities, iii) a first indication on a first position of a first electric facility of the plurality of electric facilities that is currently being inspected that indicates the position of the information processing terminal, iv) a second indication, different from the first indication, on a second position of a second electric facility of the plurality of electric facilities that indicates that inspection has been finished, and v) an indication on a connection route between two electric facilities finished with inspection in the case where an adjacent electric facility connected to the electric facility by the connection route is finished with inspection,
wherein the connection route indicates a power transmission route connected by a power transmission line.

2. The information processing system according to claim 1, further comprising:
a line map storage configured to store line map information indicating the line map, wherein the specifying unit reads the line map information from the line map storage and specifies the electric facility to be the inspection target based on information indicating the positions of the plurality of electric facilities included in the read line map information.

3. The information processing system according to claim 1, further comprising:
a screen information generator configured to generate first display image information indicating a first display image to be displayed by the information processing terminal based on the information indicating the positions of the plurality of electric facilities included in the line map and the information indicating the position of the electric facility to be the inspection target specified by the specifying unit, and configured to generate second display image information that causes the display controller to change a display state of the first image display based on the information indicating an inspection result of the electric facility to be the inspection target, wherein, in the case of acquiring the first display image information, the display controller controls the information processing terminal to display the first display image based on the first display image information, and in the case of acquiring the second display image information, the display controller performs display change processing on the first display image based on the second display image information.

4. The information processing system according to claim 1, further comprising:

a determiner configured to determine whether all of inspection items relative to the electric facility to be the inspection target are finished with inspection, wherein, in the case where a part or all of the inspection items are finished with inspection, the display controller performs the display change processing, and in the case where all of the inspection items are not finished with inspection, the display controller controls the information processing terminal to display information indicating an error.

5. A non-transitory computer readable storage medium that stores a program, when executed by a computer, to cause the computer to perform at least:

specifying an electric facility to be an inspection target based on: information indicating positions of a plurality of electric facilities included in a line map that includes information indicating the positions of the plurality of electric facilities and information indicating a connection route between the electric facilities; and information indicating a position of an information processing terminal; and controlling the information processing terminal to display a graphical user interface that displays the line map, the line map including i) the positions of the plurality of electric facilities, ii) the connection route between the electric facilities, iii) a first indication on a first position of a first electric facility of the plurality of electric facilities that is currently being inspected that indicates the position of the information processing terminal, iv) a second indication, different from the first indication, on a second position of a second electric facility of the plurality of electric facilities that indicates that inspection has been finished, and v) an indication on a connection route between two electric facilities finished with inspection in the case where an adjacent electric facility connected to the electric facility by the connection route is finished with inspection, wherein the connection route indicates a power transmission route connected by a power transmission line.

6. The information processing system according to claim 1, wherein the graphical user interface further displays a photographing button that causes an image to be captured by an imager included in the information processing terminal.

7. The information processing system according to claim 6, wherein the graphical user interface further displays an on-site photograph when the photographing button has caused an image to be captured by the imager.

8. The information processing system according to claim 1, wherein the graphical user interface further displays information indicating inspection items to be executed by a user for an electric facility of the plurality of electric facilities.

9. The non-transitory computer readable storage medium according to claim 5, wherein the graphical user interface further displays a photographing button that causes an image to be captured by an imager included in the information processing terminal.

10. The non-transitory computer readable storage medium according to claim 9, wherein the graphical user interface further displays an on-site photograph when the photographing button has caused an image to be captured by the imager.

11. The non-transitory computer readable storage medium according to claim 5, wherein the graphical user interface further displays information indicating inspection items to be executed by a user for an electric facility of the plurality of electric facilities.

12. An information processing system, comprising:

a non-transitory memory configured to store instructions; and one or more hardware processors coupled to the non-transitory memory and configured to read instructions from the non-transitory memory to cause the system to perform operations comprising:

generating terminal positional information of an information processing terminal based on an inspection start operation received from a user of the information processing terminal;

transmitting the generated terminal position information to an information processor;

generating, by the information processor, first display screen information based on the terminal positional information received from the information processing terminal;

transmitting the first display screen information generated to the information processing terminal;

displaying, at the information processing terminal, a first display screen based on the first display screen information, the first display screen including a line map having i) positions of a plurality of electric facilities, ii) a connection route between the electric facilities, iii) a first indication on a first position of a first electric facility of the plurality of electric facilities that is currently being inspected that indicates the terminal position information of the information processing terminal, iv) a second indication, different from the first indication, on a second position of a second electric facility of the plurality of electric facilities that indicates that inspection has been finished, and v) an indication on a connection route between two electric facilities finished with inspection in the case where an adjacent electric facility connected to the electric facility by the connection route is finished with inspection;

receiving, at the information processing terminal after displaying the first display screen, an indication that inspection of the first electric facility has finished;

generating, by the information processing terminal, inspection result information based on the received indication that inspection of the first electric facility has finished;

transmitting the inspection result information to the information processor;

determining, by the information processor, whether inspection of the first electric facility has finished based on the inspection result information;

generating, by the information processor when inspection of the first electric facility is determined to be finished, second display screen information based on the inspection result information; and displaying, at the information processing terminal, a second display screen based on the second display screen information, the second display screen including the line map having i) positions of the plurality of electric facilities, ii) the connection route between the electric facilities, iii) a third indication on the first position of the first electric facility that indicates that inspection has been finished, iv) the second indication, the same as the third indication, on the second position of the second electric facility that indicates that inspection has been finished, and v) the indication on the connection route between two electric facilities finished with inspection in the case where the adjacent electric facility connected to the electric facility by the connection route is finished with inspection.

* * * * *